(12) United States Patent
Au et al.

(10) Patent No.: US 12,724,622 B2
(45) Date of Patent: Sep. 1, 2026

(54) ADAPTIVE DISCOVERY AND AUTOMATED DECLARATIVE TEMPLATE USING INTELLIGENT MODULES

(71) Applicant: Dell Products L.P., Round Rock, TX (US)

(72) Inventors: Kah Wai Au, Singapore (SG); Antony Prabakaran Jayaveeran, Singapore (SG); Kumaresan Pachiappan, Singapore (SG); Robin Kedia, Singapore (SG)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 19/033,196

(22) Filed: Jan. 21, 2025

(65) Prior Publication Data

US 2026/0211695 A1 Jul. 23, 2026

(51) Int. Cl.
*G06F 9/445* (2018.01)
*G06F 9/455* (2018.01)
*G06F 9/54* (2006.01)

(52) U.S. Cl.
CPC ...... *G06F 9/44505* (2013.01); *G06F 9/45558* (2013.01); *G06F 9/54* (2013.01)

(58) Field of Classification Search
CPC ..... G06F 9/44505; G06F 9/45558; G06F 9/54
See application file for complete search history.

(56) References Cited

U.S. PATENT DOCUMENTS

| | | | | |
|---|---|---|---|---|
| 2021/0224109 | A1* | 7/2021 | Wong | G06F 9/4881 |
| 2022/0114023 | A1* | 4/2022 | Choksi | G06F 9/44505 |
| 2022/0261278 | A1* | 8/2022 | Perneti | G06F 9/45558 |
| 2023/0112966 | A1* | 4/2023 | Sehgal | G06F 21/577 726/25 |
| 2023/0275756 | A1* | 8/2023 | Vishwakarma | H04L 63/0428 380/278 |
| 2023/0333869 | A1* | 10/2023 | Zoller, IV | G06F 9/45558 |
| 2023/0401273 | A1* | 12/2023 | Hou | G06F 16/128 |
| 2025/0156158 | A1* | 5/2025 | Hou | G06F 8/35 |
| 2025/0238356 | A1* | 7/2025 | Wang | G06F 11/3698 |
| 2026/0056766 | A1* | 2/2026 | Li | G06F 9/45558 |

(Continued)

*Primary Examiner* — Aurel Prifti

(74) *Attorney, Agent, or Firm* — Chamberlain, Hrdlicka, White, Williams & Aughtry; Aly Z. Dossa

(57) ABSTRACT

A method for generating a declarative template to manage a computing environment includes: receiving a request from a workload management interface; analyzing the request to extract a predefined configuration of a platform; providing the predefined configuration and the request to a discovery agent (DA); connecting to the environment using a connection string; after the connecting: discovering the environment to obtain a dataset related to the environment; analyzing the dataset to extract information; generating a directed acyclic graph (DAG) based on the information; analyzing the DAG to extract an inference result; providing the inference result and the predefined configuration to a template agent (TA); querying a retrieval-augmented generation (RAG) module to obtain additional information related to the environment; generating the template that is specific to the environment using the inference result, predefined configuration, and additional information; and providing the template to an integration agent.

20 Claims, 6 Drawing Sheets

(56) References Cited

U.S. PATENT DOCUMENTS

| | | | | |
|---|---|---|---|---|
| 2026/0064378 | A1 * | 3/2026 | Genis | G06F 8/35 |
| 2026/0111200 | A1 * | 4/2026 | Gopalan | G06F 8/447 |
| 2026/0133818 | A1 * | 5/2026 | Isaacs | G06F 9/45558 |

* cited by examiner

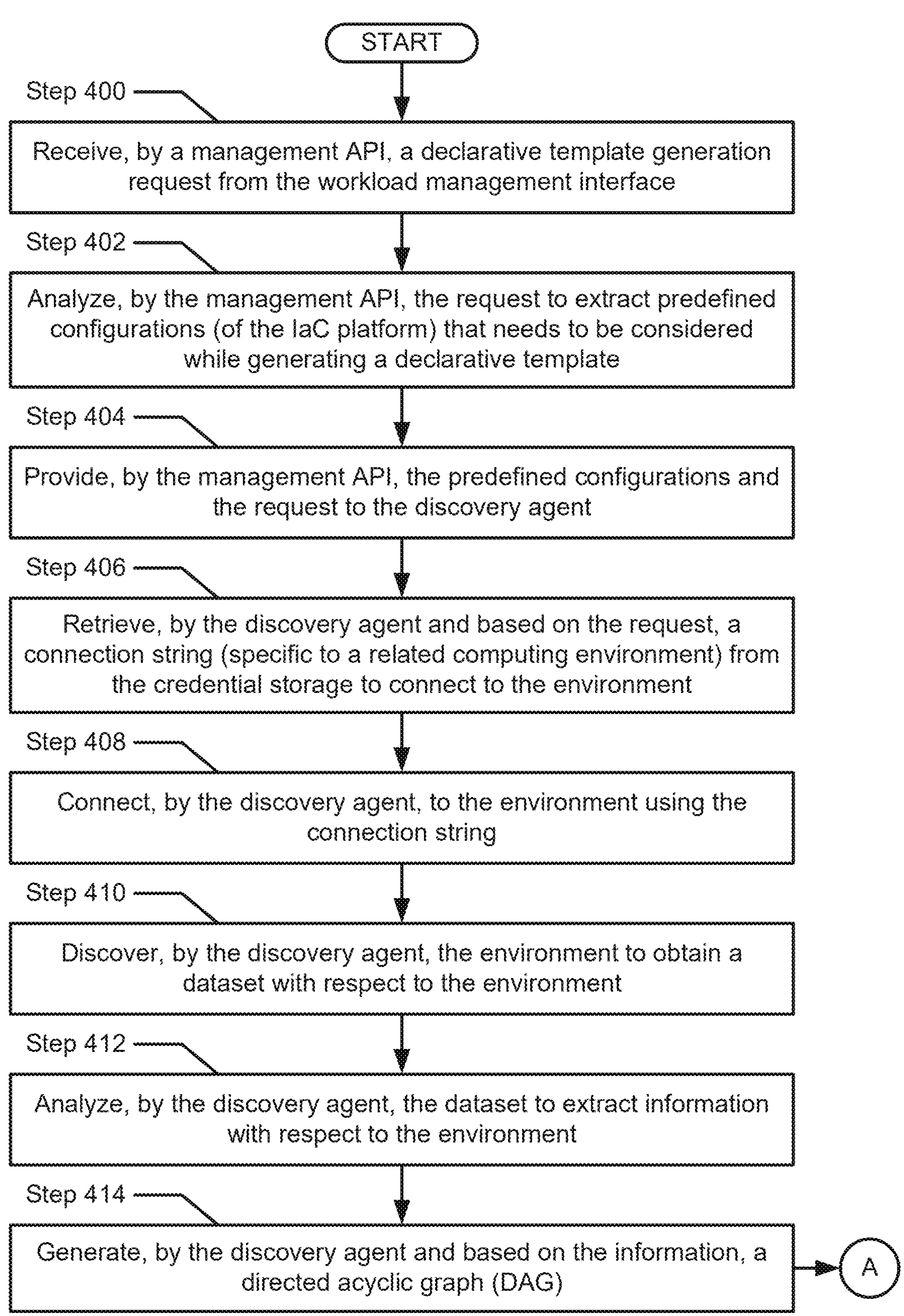
FIG. 4.1

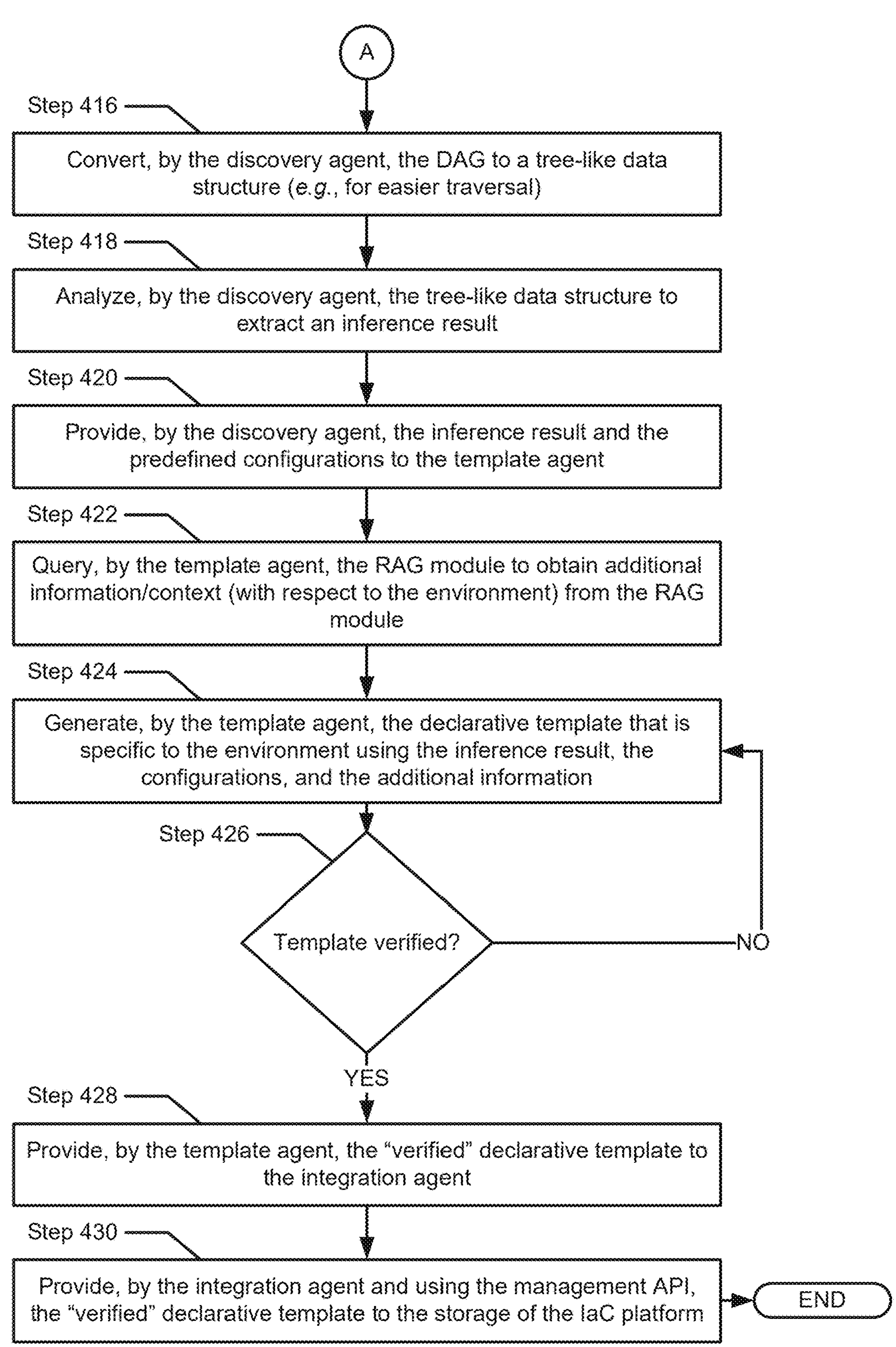
FIG. 4.2

ADAPTIVE DISCOVERY AND AUTOMATED DECLARATIVE TEMPLATE USING INTELLIGENT MODULES

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 4.1-4.2 show a method for generating a declarative template to manage a computing environment in accordance with one or more embodiments disclosed herein.

DETAILED DESCRIPTION

Figure 1:
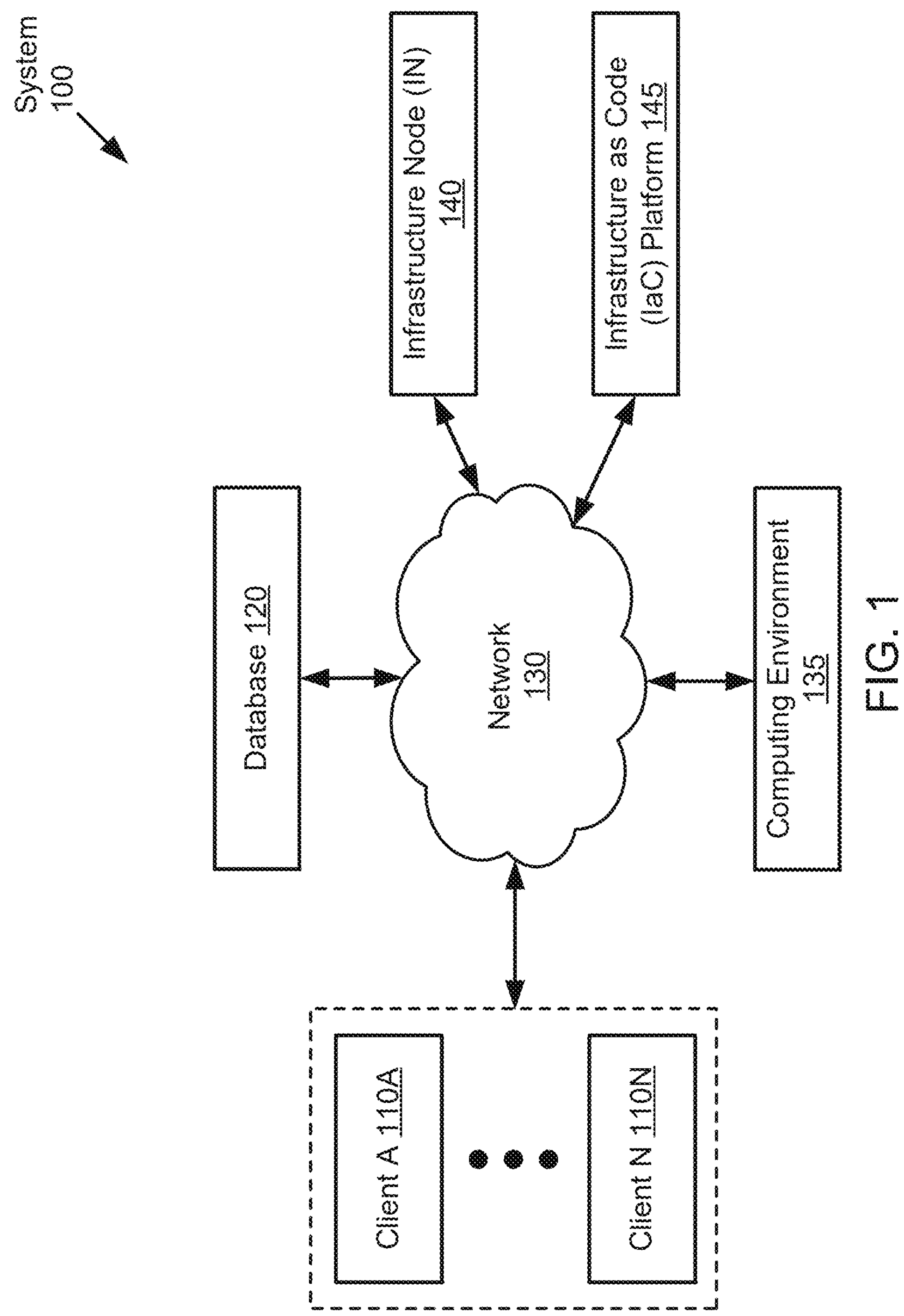
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase “operatively connected” may refer to any direct connection (e.g., wired directly between two devices or components) or indirect connection (e.g., wired and/or wireless connections between any number of devices or components connecting the operatively connected devices). Thus, any path through which information may travel may be considered an operative connection.

The current state of brownfield resource discovery and declarative template (e.g., an infrastructure as code (IaC) tool that allows users to configure and deploy cloud and/or on-premises infrastructures) deployment is faced with several challenges, including: (i) discovered brownfield resources (e.g., virtual machines) in a related computing environment are limited to known lifecycle management (LCM) operations (e.g., generating a newer virtual machine in the environment, removing an older/unhealthy pod from the environment, restarting a second pod in the environment, etc.), (ii) to manage a workload in a related brownfield environment, a related user has to recreate a corresponding declarative template (which varies depending on the deployed resources in the environment) every time, (iii) there is no way for a corresponding user to update configurations of deployed resources without regenerating these configurations from scratch, and (iv) there is no lift and shift solution (e.g., as a cloud migration solution) existing today.

For at least the reasons discussed above and without requiring resource-intensive efforts (e.g., time, engineering, cost, utilization of excessive computing resources, etc.), a fundamentally different approach/framework is needed (e.g., a framework that provides a multi-agent collaborative workflow to generate reliable declarative templates for management platforms that leverages these templates to perform workload management in computing environments).

Embodiments disclosed herein relate to methods and systems for generating a declarative template to manage a computing environment. As a result of the processes discussed below, one or more embodiments disclosed herein advantageously ensure that: (i) the framework automatically discovers existing infrastructure and applications of a related brownfield environment and generates one or more declarative templates (said another way, a fully automated brownfield environment discovery solution is provided to generate declarative templates based on existing infrastructures and applications so that the solution can be managed by any IaC platform or Internet of Things (IoT) platform (that leverages declarative templates for workload management in computing environments)); (ii) the generated templates are platform-agnostic, enabling seamless management across diverse IaC and IoT platforms that support declarative templates (e.g., declarative workload definitions); (iii) the framework assigns automatic management/onboarding of users'/customers'legacy brownfield applications onto a related IaC platform (said another way, the framework provides a unified way to users to perform streamlined management and deployment of their entire infrastructures); (iv) the framework provides an intelligent agent/engine based workflow (orchestrated by a series of advanced planning steps) in order to generate highly reliable declarative templates (e.g., IaC templates) that are both accurate and contextually relevant; (v) the framework provides a zero-touch solution (to users) to manage any heterogeneous and diverse brownfield environment including workloads (which eliminates manual intervention and streamlines IaC adoption in existing infrastructure landscapes/environments); (vi) the framework generates platform-agnostic declarative templates that are compatible with various IaC platforms, while eliminating the need for platform lock-in and enabling flexible deployments to related computing environments; (vii) the framework leverages machine learning (ML) models to adapt to any heterogeneous brownfield environment so that accurate declarative templates can be generated for any platform; and/or (viii) by providing a comprehensive solution for automated brownfield environment discovery and declarative template generation, the framework revolutionizes, at least, the field of brownfield discovery and execution, while enabling users to achieve increased efficiency, improved accuracy, and reduced costs in their computing environments.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a database (120), any number of infrastructure nodes (INs) (e.g., 140), a computing environment (135), an IaC platform (145), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the database (120), the IN (140), the computing environment (135), the IaC platform (145), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

As used herein, a "volume" may be analogous to a logical unit number in a storage area network (SAN), in which a volume may be a subset of a storage system (e.g., 120) capacity presented by a storage node of the storage as a local block device. A volume's data may be evenly distributed across all storage resources of the storage system, for example, according to a data layout selected for the storage system.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication, etc.), storage capacity (e.g., data backup), and data protection (e.g., software-defined data protection, disaster recovery, etc.) as a service to users (e.g., people) of clients (e.g., 110A, 110N, etc.). For example, the system may be configured to organize unbounded, continuously generated data into a data stream. The system (100) may also represent a comprehensive middleware layer executing on computing devices (e.g., 500, FIG. 5) that supports application and storage environments.

In one or more embodiments, the system (100) may support one or more virtual machine (VM) environments (e.g., 135), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users'site using the clients (e.g., 110A, 110N, etc.)) and other computations remotely (e.g., away from the users'site using the IN (140)) from the users. By doing so, the users may utilize different computing devices (e.g., 500, FIG. 5) that have different quantities of computing resources (e.g., processing cycles, memory, storage, etc.) while still being afforded consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as a universal serial bus (USB) device), etc.

In one or more embodiments, a client (e.g., 110A, 110N, etc.) may include functionality to, e.g.,: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.,: (i) collecting users' inputs, (ii) correlating collected users' inputs to the computer-implemented services to be provided to the users, (iii) communicating with the IN (140) and/or the database (120) that perform computations necessary to provide the computer-implemented services, (iv) using the computations performed by, for example, the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 5:
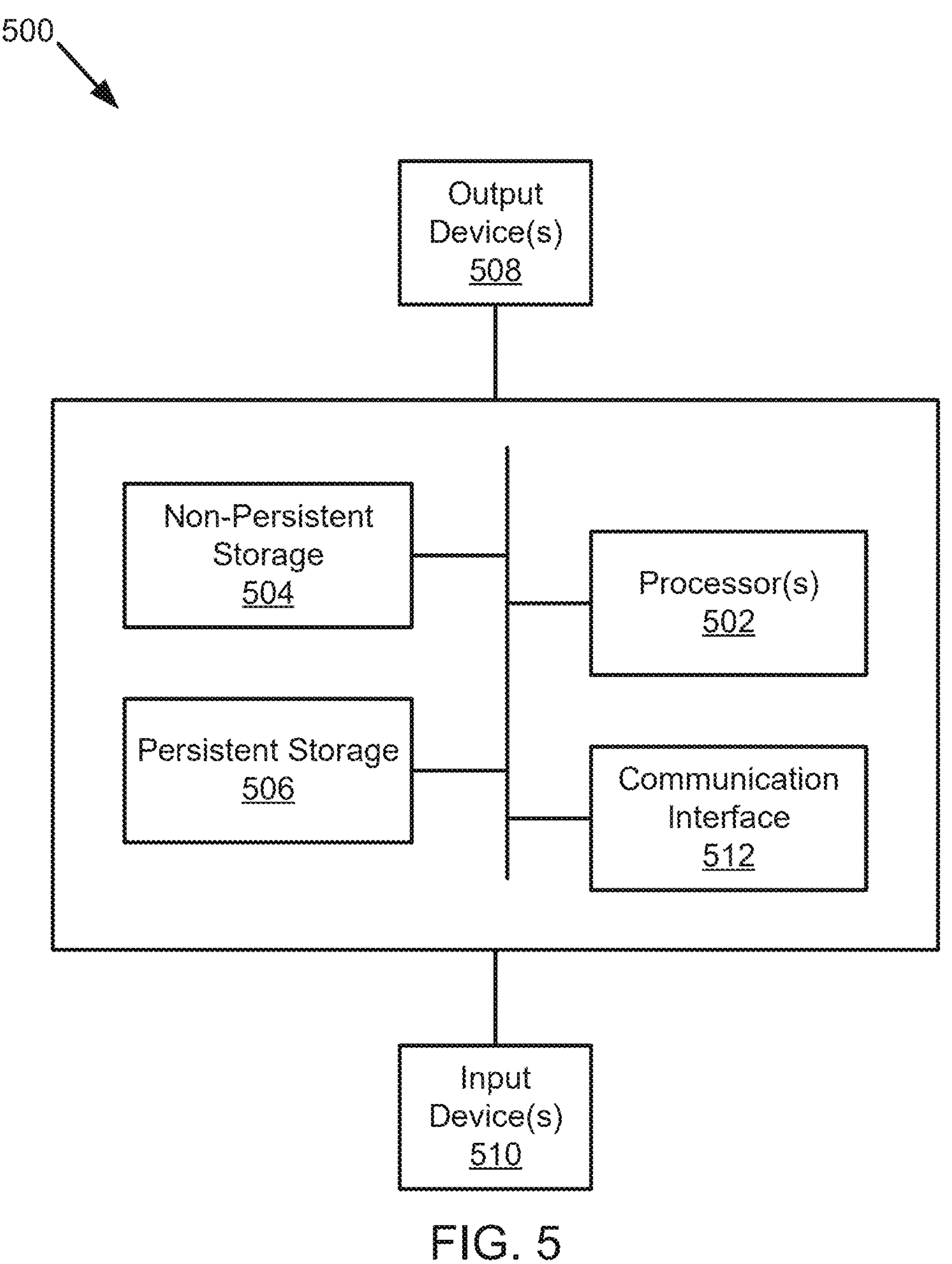
FIG. 5 shows a diagram of a computing device in accordance with one or more embodiments disclosed herein.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140) may include functionality to, e.g.,: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to a storage system (e.g., 120); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); (xxv) manage operations of one or more clients (e.g., receiving information from the clients regarding changes in the operation of the clients) to improve their operations (e.g., improve the quality of data being generated, decrease the computing resources cost of generating data, etc.); (xxvi) provide automatic onboarding of users'/customers' legacy brownfield applications onto a related IaC platform (e.g., 145) (said another way, the IN (140) provides a unified way to users to perform streamlined management and deployment of their entire infrastructures); (xxvii) leverage ML models to adapt to any heterogeneous brownfield environment (e.g., 135) so that accurate declarative templates can be generated for any platform (e.g., 145); (xxviii) generate platform-agnostic declarative templates that are compatible with various IaC platforms (e.g., 145), while eliminating the need for platform lock-in and enabling flexible deployments to related computing environments (e.g., 135); and/or (xix) provide a zero-touch solution (to users) to manage any heterogeneous and diverse brownfield environment (e.g., 135) including/executing workloads (e.g., VMs, pods, etc.). In one or more embodiments, in order to read, write, or store data, the IN (140) may communicate with, for example, the database (120) in the system (100).

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g. a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups (in connection with which embodiments disclosed herein) may be employed include (but not limited to): full backups, partial backups, clones, snapshots, incremental backups, differential backups, etc.

As used herein, "data retention" is a period of time, with a definite start and end, within which the data should be retained in a storage system (e.g., 120). For example, a set of user requirements and/or technical considerations (e.g., security considerations, performance considerations, etc.) of a data center may be used to generate a data retention policy specifying that user data should be retained in the database for seven years.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (140) may perform other functionalities without departing from the scope of the embodiments disclosed herein. In one or more embodiments, the IN (140) may be configured to perform (in conjunction with the database (120), the computing environment (135), and the IaC platform (145)) all, or a portion, of the functionalities described in FIG. 4.1-4.2.

In one or more embodiments, the IN (140) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

Figure 2:
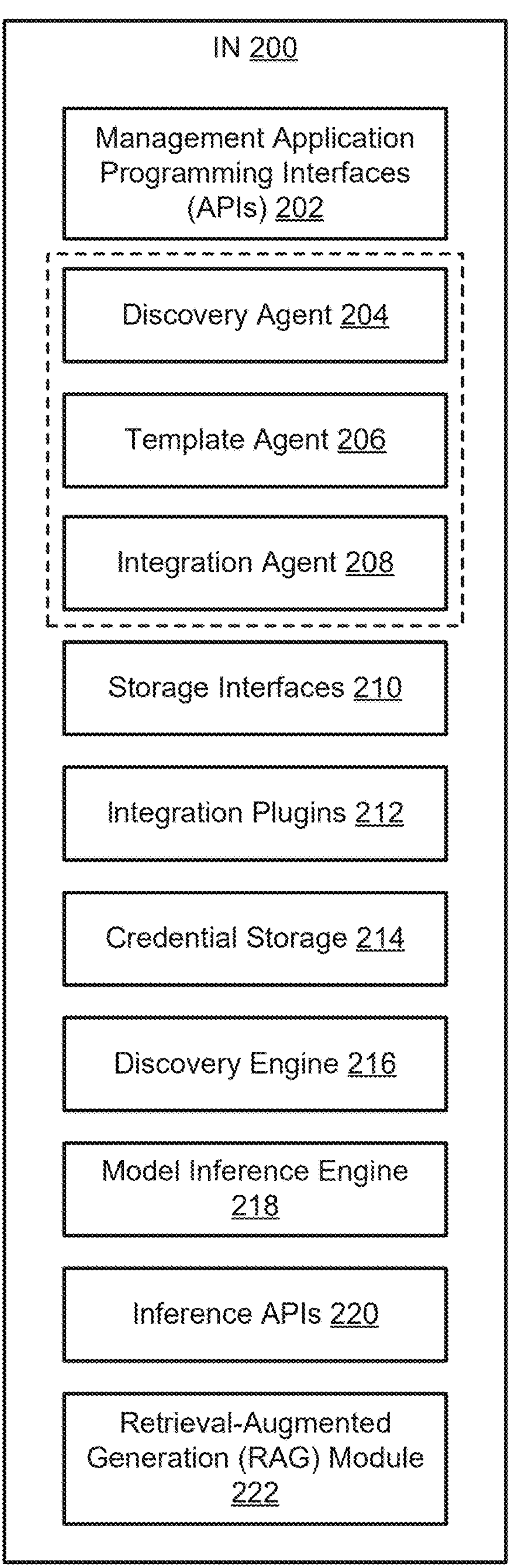
FIG. 2 shows a diagram of an infrastructure node in accordance with one or more embodiments disclosed herein.

In one or more embodiments, the IN (140) hosts, at least, a set of management application programming interfaces (APIs) (e.g., 202, FIG. 2), a discovery agent (e.g., 204, FIG. 2), a template agent (e.g., 206, FIG. 2), an integration agent (e.g., 208, FIG. 2), a set of storage interfaces (e.g., 210, FIG. 2), a set of integration plugins (e.g., 212, FIG. 2), a credential storage (e.g., 214, FIG. 2), a discovery engine (e.g., 216, FIG. 2), a model inference engine (e.g., 218, FIG. 2), a set of inference APIs (e.g., 220, FIG. 2), and a retrieval-augmented generation (RAG) module (e.g., 222, FIG. 2). The aforementioned components of the IN (140) may be physical or logical computing devices/entities. Additional details of the aforementioned components of the IN (140) are described below in reference to FIG. 2.

In the embodiments of the present disclosure, the database (120) is demonstrated as a separate entity from the IN (140); however, embodiments disclosed herein are not limited as such. The database (120) may be demonstrated as a part of the IN (e.g., as deployed to the IN (140)).

Turning now to the database (120), the database (120) may provide long-term, durable, high read/write throughput data storage/protection with near-infinite scale and low-cost. The database (120) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the database (120) may store data (e.g., backup data; file system metadata; assets; rules and/or procedures for performing backups of the IN (140); etc.). Further, the database (120) may also occupy a portion of a physical storage/memory device or, alternatively, may span across multiple physical storage/memory devices. The database (120) may include other and/or additional functionalities without departing from embodiments disclosed herein.

In one or more embodiments, the database (120) may be implemented using physical devices that provide data storage services (e.g., storing data and providing copies of previously stored data). The devices that provide data storage services may include hardware devices and/or logical devices. For example, the database (120) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (120) may include a memory device (e.g., a dual in-line memory device), in which data is stored and from which copies of previously stored data are provided. As yet another example, the database (120) may include a persistent storage device (e.g., an SSD), in which data is stored and from which copies of previously stored data is provided. As yet another example, the database (120) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (120) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (120) may store/log/record unstructured and/or structured data that may include (or specify), for example (but not limited to): a backup policy/practice; telemetry data including past and present device usage of one or more computing devices; data for execution of applications/services including IN applications and associated end-points; corpuses of annotated data used to build/generate and train processing classifiers for trained ML models; linear, non-linear, and/or ML model parameters; data tags; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user (e.g., a unique string or combination of bits associated with a particular user) who initiated a backup (via a client); a distributed model identifier that uniquely identifies a distributed model; a user activity performed on a data item; a cumulative history of user/administrator activity records obtained over a prolonged period of time; a setting (and a version) of a mission critical application executing on the IN (140); configuration information associated with the IN (140); a job detail of a job that has been initiated by the IN; a type of the job (e.g., a non-parallel processing job, a parallel processing job, an analytics job, etc.); information associated with a hardware resource set (discussed below) of the IN; a completion timestamp encoding a date and/or time reflective of the successful completion of a job; a time duration reflecting the length of time expended for executing and completing a job; a backup retention period associated with an asset (e.g., data item); a status of a job (e.g., how many jobs are still active, how many jobs are completed, etc.); a number of requests handled (in parallel) per minute (or per second, per hour, etc.) by the IN (140); a number of errors encountered when handling a job (e.g., a backup process); a documentation that shows how the IN (140) performs against an SLO and/or an SLA; a set of requests received by the IN (140); a set of responses provided (by the IN) to those requests; information regarding an administrator (e.g., a high priority trusted administrator, a low priority trusted administrator, etc.) related to a job; tier/level information of a user (e.g., a high-privileged user, a low-privileged user, etc.); a geographic location (e.g., a country) associated with the user; a timestamp showing when a specific request is processed by the IN (140); computing resource details (including details of hardware components and/or software components) and an IP address of an IN (e.g., 140) hosting an application where a specific request is processed; information with respect to historical metadata (e.g., system logs, applications logs, telemetry data including past and present device usage of one or more computing devices in the system (100), etc.); computing resource details and an IP address of a client that sent a specific request (e.g., to the IN (140)); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; data with respect to a corresponding computing environment (e.g., computing environment-specific data); etc.

In one or more embodiments, information associated with a hardware resource set (e.g., including at least resource related parameters) may specify, for example (but not limited to): a configurable CPU option (e.g., a valid/legitimate vCPU count for the IN (140)), a configurable network resource option (e.g., enabling/disabling single-root input/output virtualization (SR-IOV) for the IN (140)), a configurable memory option (e.g., maximum and minimum memory for the IN (140)), a configurable GPU option (e.g., allowable scheduling policy and/or virtual GPU (vGPU) count combinations for the IN (140)), a configurable DPU option (e.g., legitimacy of disabling inter-integrated circuit (I2C) for the IN (140)), a configurable storage space option (e.g., a list of disk cloning technologies across one or more INs in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, metadata (e.g., system logs, application logs, etc.) may be obtained (or dynamically fetched) as they become available (e.g., with no user manual intervention), or by the discovery agent (e.g., 204, FIG. 2) polling a corresponding client (e.g., 110A) (by making schedule-driven/periodic API calls (via the management APIs (e.g., 202, FIG. 2)) to the client without affecting the client's ongoing production workloads) for newer metadata, for example, before analyzing a health state of the client. Based on receiving the API calls from the discovery agent, the client may allow the discovery agent to obtain the metadata.

In one or more embodiments, the metadata may be obtained (or streamed) continuously as they generated, or they may be obtained in batches, for example, in scenarios where (i) the discovery agent (e.g., 204, FIG. 2) receives a metadata analysis request (or a health state check request for a client), (ii) another IN of the system (100) accumulates the metadata and provides them to the discovery agent at fixed time intervals, or (iii) the database (120) stores the metadata and notify the discovery agent to access the metadata from the database. In one or more embodiments, metadata may be access-protected for a transmission from the database (120) to the discovery agent (e.g., 204, FIG. 2), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (120), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): a set of newer backup rules is received, an ongoing backup process is fully completed, a state of the IN (140) is changed, etc.

While the database (120) has been illustrated and described as including a limited number and type of data, the database (120) may store additional, less, and/or different data without departing from the scope of the embodiments disclosed herein. One of ordinary skill will appreciate that the database (120) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the storage nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Turning now to the computing environment (135), the computing environment (135) may be associated with a user of a client (e.g., 110A) and may be, for example (but not limited to): a data center, a virtual private cloud computing environment, a cloud computing environment, an internal information technology (IT) environment (e.g., a users'site), an external IT environment (e.g., a private (or a public) cloud environment provided by a third-party vendor/organization), an existing/brownfield computing environment, an on-premises environment, etc. In one or more embodiments, the user may use the computing environment (135) to execute/manage one or more workloads and/or applications (e.g., VMs, pods, etc.) to receive computer-implemented services.

Turning now to the IaC platform (145), upon receiving a request from a user of a client (e.g., 110A), the IaC platform (145) may leverage one or more declarative templates (generated by the components of the IN (140) and then stored in a storage (e.g., 304, FIG. 3) of the IaC platform (145)) to perform workload management in the computing environment (135). For example, consider a scenario where the user wants to migrate from Infrastructure X (currently being used in the computing environment (135)) to Infrastructure Y (planned to be used in the computing environment (135)). To this end, in this scenario, the discovery agent (e.g., 204, FIG. 2) may discover Infrastructure X to obtain information (e.g., workload details, computing resource details, etc.) with respect to Infrastructure X. Thereafter, in conjunction with the discovery agent (e.g., 204, FIG. 2) and based on the information, the template agent (e.g., 206, FIG. 2) may generate a declarative template (e.g., a text file, a configuration file that is written in a human-readable data serialization language, etc.) that is needed to migrate to Infrastructure Y and provide the template (via the integration agent (e.g., 208, FIG. 2)) to the IaC platform (145). Based on the declarative template, the IaC platform (145) may perform the migration to Infrastructure Y (without human interaction) and notify the user (via a GUI of the client) to indicate that Infrastructure Y is currently being used in the computing environment (135). Said another way, based on the declarative template, the IaC platform (145) may provision and manage the computing environment (135) so that the computing environment (135) can use (or be executed based on) Infrastructure Y.

In the embodiments of the present disclosure, the platform (in the system (100)) is demonstrated as an IaC platform (e.g., 145); however, embodiments disclosed herein are not limited as such. The platform may be demonstrated as an IoT platform (or any other platform that supports declarative template-based workload management in a corresponding computing environment).

One of ordinary skill will appreciate that the IaC platform (145) may perform other functionalities without departing from the scope of the embodiments disclosed herein.

In one or more embodiments, the IaC platform (145) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IaC platform described throughout the application.

Alternatively, in one or more embodiments, similar to a client (e.g., 110A, 110N, etc.), the IaC platform (145) may also be implemented as a logical device.

While FIG. 1 shows a configuration of components, other system configurations may be used without departing from the scope of the embodiments disclosed herein.

Turning now to FIG. 2, FIG. 2 shows a diagram of an IN (200) in accordance with one or more embodiments disclosed herein. The IN (200) may be an example of the IN discussed above in reference to FIG. 1. In one or more embodiments, the IN (200) may be used as a bridge between the computing environment (e.g., 135, FIG. 1) and the IaC platform (e.g., 145, FIG. 1). The IN (200) includes the management APIs (202), the discovery agent (204), the template agent (206), the integration agent (208), the storage interfaces (210), the integration plugins (212), the credential storage (214), the discovery engine (216), the model inference engine (218), the inference APIs (220), and the RAG module (222). The IN (200) may include additional, fewer, and/or different components without departing from the scope of the embodiments disclosed herein. Each component may be operably connected to any of the other components via any combination of wired and/or wireless connections. Each component illustrated in FIG. 2 is discussed below.

In one or more embodiments, the management APIs (202) (e.g., GUIs, application service layers/interfaces, communication channels, etc.) may be used as the main integration components with any IaC platform (e.g., 145, FIG. 1) (available in the system (e.g., 100, FIG. 1)) that leverages declarative templates for workload management in computing environments (e.g., 135, FIG. 1). The management APIs (202) may include, for example (but not limited to): a set of configuration APIs, a set of discovery plugins APIs, a set of discovery APIs, a set of integration APIs, a set of RAG APIs, etc.

In one or more embodiments, the configuration APIs may be used/employed (by a corresponding component of the system (e.g., 100, FIG. 1)) to, at least: (i) configure available inference engine options (e.g., the model inference engine (218) may use the configuration APIs to employ other, more powerful ML models that are hosted on cloud platforms or specialized services); (ii) receive, via a workload management interface (e.g., 302, FIG. 3) (of the IaC platform (e.g., 145, FIG. 1), a request (sent by a user of a client (e.g., 110A, FIG. 1), where the request may specify which computing environment (e.g., 135, FIG. 1) in the system needs to be discovered; (iii) configure syntax and/format of generated declarative templates (e.g., the integration agent (208) may use the configuration APIs to perform (iii), see Step 426 of FIG. 4.2); (iv) store generated declarative templates internally in the IN (200) (e.g., after generating, the template agent (206) may store the declarative templates in a storage of the IN (200)); and/or (v) employ a set of subroutine definitions, protocols, and/or hardware/software component for enabling communications between the components of the IN (200) and/to other components of the system (e.g., 100, FIG. 1).

In one or more embodiments, the discovery plugins APIs may be used (by a corresponding component of the system (e.g., 100, FIG. 1)) to, at least, allow a user (of a client (e.g., 110A, FIG. 1)) to add custom discovery plugins (to the IN (200)) so that the discovery agent (204) may use the correct discovery plugins while discovering details (e.g., applications/workloads being executed, the infrastructure being used, etc.) of the computing environment (e.g., 135, FIG. 1), and employ a set of subroutine definitions, protocols, and/or hardware/software component for enabling communications between the components of the IN (200) to other components of the system (e.g., 100, FIG. 1).

In one or more embodiments, the discovery APIs may be used by the IaC platform (e.g., 145, FIG. 1) and/or the discovery agent (204) to, at least, start the discovery process of the computing environment (e.g., 135, FIG. 1), and employ a set of subroutine definitions, protocols, and/or hardware/software component for enabling communications between the components of the IN (200) to other components of the system (e.g., 100, FIG. 1). The discovery process may include, for example (but not limited to): registering to the computing environment with credentials (e.g., connecting to the environment using a connection string, see Step 408 of FIG. 4.1), retrieving information about the discovery (e.g., obtaining a dataset with respect to the environment, see Step 410 of FIG. 4.1), etc.

In one or more embodiments, the integration APIs may be used by the integration agent (208) to, at least, register integration invocations (such as providing scripts to be executed as plugins (e.g., the integration plugins (212)) when integrating with the IaC platform (e.g., in order to provide a "verified" declarative template to the storage of the IaC platform, see Step 430 of FIG. 4.2), and employ a set of subroutine definitions, protocols, and/or hardware/software component for enabling communications between the components of the IN (200) to other components of the system (e.g., 100, FIG. 1). Said another way, when the generated declarative template is verified, the integration agent (208) may invoke the integration APIs to push the template to the IaC platform (e.g., 145, FIG. 1).

In one or more embodiments, the RAG APIs may be used (by a corresponding component of the system (e.g., 100, FIG. 1)) to, at least, manually upload one or more documents (e.g., documents and/or deployment guides for specific applications/workloads) so that these documents can be provided by the RAG module (222), as added context, to the template agent (206) (see Step 422 of FIF. 4.2), and employ a set of subroutine definitions, protocols, and/or hardware/software component for enabling communications between the components of the IN (200) to other components of the system (e.g., 100, FIG. 1).

One of ordinary skill will appreciate that the management APIs (202) may perform other functionalities without departing from the scope of the embodiments disclosed herein. In one or more embodiments, the management APIs (202) may be configured to perform all, or a portion, of the functionalities described in FIG. 4.1-4.2. An API of the management APIs (202) may be implemented as a computing device using hardware (e.g., any number of integrated circuits for processing computer readable instructions, software (e.g., a computer program), or any combination thereof.

In one or more embodiments, as being a physical computing device or a logical computing device, the discovery agent (204) may include functionality to, at least: (i) receive a set of predefined configurations and a user-initiated request (see Step 400 of FIG. 4.1) from the management APIs; (ii) based on the request, retrieve a connection string (specific to a related computing environment) from the credential storage (214) to connect to the environment; (iii) connect to the environment using the connection string; (iv) using/leveraging the discovery engine (216), discover the environment to obtain a dataset with respect to the environment; (v) using the discovery engine (216), analyze the dataset to extract information (e.g., a knowledge graph) with respect to the environment; (vi) generate/construct, based on the information, a directed acyclic graph (DAG); (vii) convert the DAG to a tree-like data structure for easier traversal (e.g., to facilitate a clear and intuitive exploration of the relationships between different nodes in the DAG); (viii) analyze the tree-like data structure to extract an inference result; and/or (ix) provide the inference result and the predefined configurations to the template agent (206).

One of ordinary skill will appreciate that the discovery agent (204) may perform other functionalities without departing from the scope of the embodiments disclosed herein. In one or more embodiments, the discovery agent (204) may be configured to perform all, or a portion, of the functionalities described in FIG. 4.1-4.2. The discovery agent (204) may be implemented as a computing device using hardware (e.g., any number of integrated circuits for processing computer readable instructions, software (e.g., a computer program), or any combination thereof.

In one or more embodiments, as being a physical computing device or a logical computing device, the template agent (206) may include functionality to, at least: (i) receive the inference result and the predefined configurations from the discovery agent (204); (ii) query the RAG module (222) to obtain additional information/context (with respect to the environment (e.g., 135, FIG. 1)) from the RAG module (222); (iii) by employing the model inference engine (218), generate a declarative template that is specific to the environment (e.g., generate a template that defines the desired state of computing resources and/or workloads in the environment) using the inference result, the configurations (including, at least, configured declarative language and syntax), and the additional information; (iv) make a determination that whether or not the generated declarative template is verified; and/or (v) if verified, provide the declarative template to the integration agent (208).

One of ordinary skill will appreciate that the template agent (206) may perform other functionalities without departing from the scope of the embodiments disclosed herein. In one or more embodiments, the template agent (206) may be configured to perform all, or a portion, of the functionalities described in FIG. 4.1-4.2. The template agent (206) may be implemented as a computing device using hardware (e.g., any number of integrated circuits for processing computer readable instructions, software (e.g., a computer program), or any combination thereof.

In one or more embodiments, as being a physical computing device or a logical computing device, the integration agent (208) may include functionality to, at least: (i) receive the verified declarative template from the template agent (206); (ii) act as a bridge between the verified declarative template and the desired destination in the IaC platform (e.g., 145, FIG. 1); and/or (iii) provide the verified declarative template to the desired destination in the IaC platform (by ensuring flexibility, adaptability, and agnosticism while providing the template to the IaC platform).

In one or more embodiments, the desired destination in the IaC platform (e.g., 145, FIG. 1) may be the storage (e.g., 304, FIG. 3) (for a later use of the template) or the APIs (e.g., 306, FIG. 3) (for an immediate use of the template by a processor (of the IaC platform) so that, based on the template, the processor may provision and manage the computing environment (e.g., 145, FIG. 1)). In one or more embodiments, in order to communicate with the storage (e.g., 304, FIG. 3) (so that the template can be provided), the integration agent (208) may use the storage interfaces (210). Separately, in order to communicate with the APIs (e.g., 306, FIG. 3) (so that the template can be provided), the integration agent (208) may use the integration plugins (212).

One of ordinary skill will appreciate that the integration agent (208) may perform other functionalities without departing from the scope of the embodiments disclosed herein. In one or more embodiments, the integration agent (208) may be configured to perform all, or a portion, of the functionalities described in FIG. 4.1-4.2. The integration agent (208) may be implemented as a computing device using hardware (e.g., any number of integrated circuits for processing computer readable instructions, software (e.g., a computer program), or any combination thereof.

In one or more embodiments, the discovery agent (204), the template agent (206), and the integration agent (208) may be grouped together as "agents" (illustrated with the dashed lines) in the IN (200).

In one or more embodiments, the storage interfaces (210) (e.g., APIs, GUIs, application services/interfaces, communication channels, etc.) may be used by, at least, the integration agent (208). A storage interface of the storage interfaces (210) may employ a set of subroutine definitions, protocols, and/or hardware/software component for enabling communications between the integration agent (208) to other components of the system (e.g., 100, FIG. 1). One of ordinary skill will appreciate that the storage interfaces (210) may perform other functionalities without departing from the scope of the embodiments disclosed herein. A storage interface of the storage interfaces (210) may be implemented as a computing device using hardware (e.g., any number of integrated circuits for processing computer readable instructions, software (e.g., a computer program), or any combination thereof.

Figure 3:
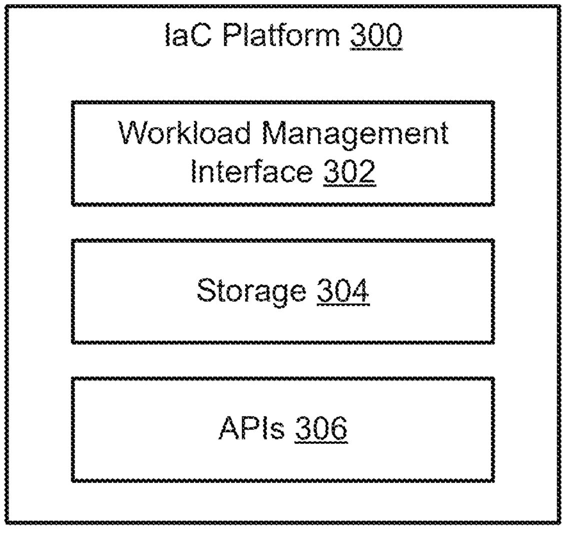
FIG. 3 shows a diagram of an infrastructure as code platform in accordance with one or more embodiments disclosed herein.

In one or more embodiments, a plugin of the integration plugins (212) may represent a computer program that facilitates interchange between, for example, the integration agent (208) and the APIs (e.g., 306, FIG. 3). Specifically, a plugin of the integration plugins (212) may represent a device driver or a device interface through which APIs'(e.g., 306, FIG. 3) functions and resources may be invoked and accessed, respectively. To that extent, a plugin of the integration plugins (212) may include various functionalities, for example (but not limited to), translating I/O (i.e., read and/or write) requests from the integration agent (208) to the APIs (e.g., 306, FIG. 3).

One of ordinary skill will appreciate that the integration plugins (212) may perform other functionalities without departing from the scope of the embodiments disclosed herein.

Turning now to the credential storage (214), the credential storage (214) may provide long-term, durable, high read/write throughput data storage/protection with near-infinite scale and low-cost. The credential storage (214) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the credential storage (214) may also occupy a portion of a physical storage/memory device or, alternatively, may span across multiple physical storage/memory devices. The credential storage (214) may include other and/or additional functionalities without departing from embodiments disclosed herein.

In one or more embodiments, the credential storage (214) may be implemented using physical devices that provide data storage services (e.g., storing data and providing copies of previously stored data). The devices that provide data storage services may include hardware devices and/or logical devices. For example, the credential storage (214) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the credential storage (214) may include a memory device (e.g., a dual in-line memory device), in which data is stored and from which copies of previously stored data are provided. As yet another example, the credential storage (214) may include a persistent storage device (e.g., an SSD), in which data is stored and from which copies of previously stored data is provided. As yet another example, the credential storage (214) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the credential storage (214) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the credential storage (214) may store/log/record unstructured and/or structured data that may include (or specify), for example (but not limited to): credentials of a corresponding computing environment (e.g., the location of the environment, the IP address of the environment, etc.), a connection string of a corresponding computing environment, etc.

In one or more embodiments, the credential storage (214) may be a secure storage system. To this end, (i) assets (e.g., files, folders, etc.) may be stored in an encrypted format and (ii) a set of hardware security modules, a secure key management system, and/or trusted platform modules may be hosted by the credential storage (214). To protect data that is in transit (e.g., to the discovery agent (204)) and at rest (in the credential storage (214)), the credential storage (214) may use/implement end-to-end encryption. For example, when providing a connection string to the discovery agent (204), the credential storage (214) may use the transport layer security (TLS) encryption.

In one or more embodiments, the secure key management system may handle, for example (but not limited to): key (e.g., a public key, a private key, a connection string, etc.) generation, key distribution, key revocation, key rotation, key renewal, key usage tracking and auditing, etc.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the credential storage (214), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): a newer connection string is needed, an ongoing declarative template generation process is fully completed, etc.

While the credential storage (214) has been illustrated and described as including a limited number and type of data, the credential storage (214) may store additional, less, and/or different data without departing from the scope of the embodiments disclosed herein. One of ordinary skill will appreciate that the credential storage (214) may perform other functionalities without departing from the scope of the embodiments disclosed herein.

In one or more embodiments, as being a physical computing device or a logical computing device, the discovery engine (216) may enable the discovery agent (204) to discover and/or inventory details (e.g., computing resources, workloads, applications, etc.) of a corresponding computing environment (e.g., 135, FIG. 1). The discovery engine (216) may include, for example (but not limited to): a data ingestion layer (which is responsible for collecting data from a corresponding computing environment (e.g., a cloud environment, an on-premises environment, a brownfield deployment, etc.) and/or APIs and software development kits (SDKs) associated with this environment, a core engine (which is responsible for (i) the discovery and/or inventory the details of the environment, (ii) computing resource (and/or workload) classification and categorization, and/or (iii) performing relationship analyses for the discovered resources and/or workloads to generate a knowledge graph), etc. In one or more embodiments, the knowledge graph may represent relationships (e.g., dependencies, associations, communications, etc.) among the discovered resources and/or workloads (of the environment).

One of ordinary skill will appreciate that the discovery engine (216) may perform other functionalities without departing from the scope of the embodiments disclosed herein. The discovery engine (216) may be implemented as a computing device using hardware (e.g., any number of integrated circuits for processing computer readable instructions, software (e.g., a computer program), or any combination thereof.

In one or more embodiments, as being a physical computing device or a logical computing device, the model inference engine (218) may be designed to efficiently generate declarative templates using, at least, (i) an internally available (e.g., available in the IN (200)), trained (on a vast dataset of declarative templates (e.g., IaC templates)) and fine-tuned (on a computing environment-specific dataset/data) ML model (e.g., a large language model (LLM)) or (ii) an externally available (e.g., available outside of the IN (200)) ML model that is hosted on, for example, public cloud platforms or specialized services/servers.

In one or more embodiments, the internally available ML model may have domain expertise on IaCs, ensuring high-quality and syntactically correct template generation. By focusing solely on IaC-related knowledge (e.g., the IaC templates), the internally available ML model may be significantly smaller than general-purpose LLMs, leading to faster performance of declarative template generation related tasks.

In one or more embodiments, in order to use the externally available ML model (e.g., in order to offload declarative template generation related tasks to remote servers so that the IN (200) can handle tasks exceeding the computational capacity of the IN (200)), the model inference engine (218) may use the inference APIs (220) (e.g., to communicate and/or exchange data with a specialized server).

One of ordinary skill will appreciate that the model inference engine (218) may perform other functionalities without departing from the scope of the embodiments disclosed herein. The model inference engine (218) may be implemented as a computing device using hardware (e.g., any number of integrated circuits for processing computer readable instructions, software (e.g., a computer program), or any combination thereof.

In one or more embodiments, the inference APIs (220) (e.g., GUIs, application services/interfaces, communication channels, etc.) may be used by, at least, the model inference engine (218). An inference API of the inference APIs (220) may employ a set of subroutine definitions, protocols, and/or hardware/software component for enabling communications between the inference engine (218) to, for example, public cloud platforms or specialized servers. One of ordinary skill will appreciate that the storage interfaces (210) may perform other functionalities without departing from the scope of the embodiments disclosed herein. An API of the inference APIs (220) may be implemented as a computing device using hardware (e.g., any number of integrated circuits for processing computer readable instructions, software (e.g., a computer program), or any combination thereof.

In one or more embodiments, as being a physical computing device or a logical computing device, the RAG module (222) may be designed to provide additional contextual information (e.g., to the ML model being used by the template agent (206) via the model inference engine (218)) about related computing environments (e.g., 135, FIG. 1). The RAG module (222) may retrieve relevant data (e.g., computing environment-specific data) from a knowledge base (e.g., 120, FIG. 1 (as a vectorized database)) and generate a human-readable text that provides additional contextual information (to the ML model for declarative template generation process).

In one or more embodiments, in order to generate the human-readable text, the RAG module (222) may implement two stages: (i) the indexing stage and (ii) the retrieval stage. In the indexing stage, the RAG module (222) may perform efficient information retrieval from the knowledge base. This retrieval process may include transforming a vast collection of data sources (involving structured, semi-structured, and/or unstructured assets) into a format (e.g., indexed data) readily usable by the ML model.

In the retrieval stage, the RAG module (222) may efficiently locate relevant information/data from the indexed data (so that the ML model can use the most relevant data to perform its functionalities). This process ensures that the template agent's query (see Step 422 of FIG. 4.2) is processed in the same language used for creating and storing the embeddings while generating the indexed data.

One of ordinary skill will appreciate that the RAG module (222) may perform other functionalities without departing from the scope of the embodiments disclosed herein. The RAG module (222) may be implemented as a computing device using hardware (e.g., any number of integrated circuits for processing computer readable instructions, software (e.g., a computer program), or any combination thereof.

In one or more embodiments, the management APIs (202), the discovery agent (204), the template agent (206), the integration agent (208), the storage interfaces (210), the integration plugins (212), the credential storage (214), the discovery engine (216), the model inference engine (218), the inference APIs (220), and the RAG module (222) may be utilized in isolation and/or in combination to provide the aforementioned functionalities. These functionalities may be invoked using any communication model including, for example, message passing, state sharing, memory sharing, etc.

Turning now to FIG. 3, FIG. 3 shows a diagram of an IaC platform (300) in accordance with one or more embodiments disclosed herein. The IaC platform (300) may be an example of the IaC platform discussed above in reference to FIG. 1. The IaC platform (300) includes the workload management interface (302), the storage (304), and the APIs (306). The IaC platform (300) may include additional, fewer, and/or different components without departing from the scope of the embodiments disclosed herein. Each component may be operably connected to any of the other components via any combination of wired and/or wireless connections. Each component illustrated in FIG. 3 is discussed below.

In one or more embodiments, the workload management interface (302) (e.g., an API, a GUI, an application service/interface, a communication channel, etc.) may be used by, at least, the processor of the IaC platform (300) and the management APIs (e.g., 202, FIG. 2). The workload management interface (302) may employ a set of subroutine definitions, protocols, and/or hardware/software components for enabling communications between the processor and, for example, the management APIs (e.g., 202, FIG. 2). One of ordinary skill will appreciate that the workload management interface (302) may perform other functionalities without departing from the scope of the embodiments disclosed herein. The workload management interface (302) may be implemented as a computing device using hardware (e.g., any number of integrated circuits for processing computer readable instructions, software (e.g., a computer program), or any combination thereof.

Turning now to the storage (304), the storage (304) may provide long-term, durable, high read/write throughput data storage/protection with near-infinite scale and low-cost. The storage (304) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the storage (304) may also occupy a portion of a physical storage/memory device or, alternatively, may span across multiple physical storage/memory devices. The storage (304) may include other and/or additional functionalities without departing from embodiments disclosed herein.

In one or more embodiments, the storage (304) may be implemented using physical devices that provide data storage services (e.g., storing data and providing copies of previously stored data). The devices that provide data storage services may include hardware devices and/or logical devices. For example, the storage (304) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage (304) may include a memory device (e.g., a dual in-line memory device), in which data is stored and from which copies of previously stored data are provided. As yet another example, the storage (304) may include a persistent storage device (e.g., an SSD), in which data is stored and from which copies of previously stored data is provided. As yet another example, the storage (304) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage (304) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the storage (304) may store/log/record unstructured and/or structured data that may include (or specify), for example (but not limited to), generated declarative templates.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the storage (304), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to), a newer declarative template (that needs to be used while operating on a related computing environment) is received.

While the storage (304) has been illustrated and described as including a limited number and type of data, the storage (304) may store additional, less, and/or different data without departing from the scope of the embodiments disclosed herein. One of ordinary skill will appreciate that the storage (304) may perform other functionalities without departing from the scope of the embodiments disclosed herein.

In one or more embodiments, an API of the APIs (306) (e.g., a GUI, an application service/interface, a communication channel, etc.) may be used by, at least, the processor of the IaC platform (300) and the integration agent (e.g., 208, FIG. 2). An API of the APIs (306) may employ a set of subroutine definitions, protocols, and/or hardware/software components for enabling communications between the processor (of the IaC platform (300)) and, for example, integration agent (e.g., 208, FIG. 2). One of ordinary skill will appreciate that the APIs (306) may perform other functionalities without departing from the scope of the embodiments disclosed herein. An API of the APIs (306) may be implemented as a computing device using hardware (e.g., any number of integrated circuits for processing computer readable instructions, software (e.g., a computer program), or any combination thereof.

FIG. 4.1-4.2 show a method for generating a declarative template to manage a computing environment in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.1, the method shown in FIG. 4.1 may be executed by, for example, the above-discussed management APIs (e.g., 202, FIG. 2) and discovery agent (e.g., 204, FIG. 2). Other components of the system (100) illustrated in FIG. 1 may also execute all or part of the method shown in FIG. 4.1 without departing from the scope of the embodiments disclosed herein.

In Step 400, a corresponding management API of the management APIs receives a declarative template generation request from the workload management interface (e.g., 302, FIG. 3). In one or more embodiments, the request may be a user-initiated request, in which the user (of a client (e.g., 110A, FIG. 1)) may want to migrate from Infrastructure X (currently being used in the computing environment (e.g., 135, FIG. 1)) to Infrastructure Y (planned to be used in the computing environment). The request may specify which computing environment is related to the user (so that this computing environment can be discovered by the discovery agent).

In one or more embodiments, the management API and the workload management interface may be operatively connected to each other over a network (e.g., 130, FIG. 1).

In Step 402, the management API analyzes the request to extract predefined configurations (of the IaC platform (e.g., 145, FIG. 1)) that needs to be considered while generating a declarative template (e.g., a configuration file, a deployment script, etc.). In one or more embodiments, a predefined configuration may be a schema that indicates requirements that the declarative template should have/satisfy so that the IaC platform can understand and use the template (e.g., to provision and manage the computing environment accordingly). In Step 404, the management API provides the predefined configurations and the request to the discovery agent.

In Step 406, based on the request, the discovery agent retrieves a connection string (specific to the computing environment) from the credential storage (e.g., 214, FIG. 2) to connect to the environment. In one or more embodiments, the connection string may be specific to the environment and include credentials associated with the environment. In Step 408, based on the request, the discovery agent connects to the environment using the connection string.

In Step 410, after connecting to the environment, the discovery agent discovers (using the discovery engine (e.g., 216, FIG. 2) or an ML model being employed by the discovery engine) the environment to obtain a dataset with respect to the environment. In one or more embodiments, the dataset may specify, for example (but not limited to): applications/workloads that are being executed on the environment, computing resources (e.g., pods, VMs, CPUs, GPUs, memory, vCPUs, DPUs, networking resources, etc.) that are being used in the environment, an infrastructure that is being implemented in the environment, a number of each of the applications/workloads that are being executed on the environment, a number of each of the computing resources that are being used in the environment, a type of each of the applications/workloads that are being executed on the environment, a type of each of the computing resources that are being used in the environment, a relationship between a first application to a second application in the environment, etc.

In Step 412, the discovery agent analyzes (using the discovery engine or the ML model being employed by the discovery engine) the dataset to extract information with respect to the environment. In one or more embodiments, the information (e.g., a knowledge graph) may specify, for example (but not limited to): a relationship between a first application to a second application in the environment, a relationship between a first computing resource to a second computing resource in the environment, a key feature of an application, a key feature of a computing resource, etc.

In one or more embodiments, while analyzing the dataset, the discovery engine (or the ML model being employed by the discovery engine) may perform, for example (but not limited to): entity recognition, dependency parsing, semantic role labeling, etc.

In Step 414, based on the information, the discovery agent generates a DAG. In one or more embodiments, the DAG may specify (using topological sorting so that the DAG is indeed acyclic), for example (but not limited to): discovered applications/workloads and computing resources (in the environment), relationships among the workloads and the computing resources, a type and a number of each of the discovered workloads and computing resources, etc. Following Step 414, the method proceeds to Step 416 of FIG. 4.2.

Turning now to FIG. 4.2, the method shown in FIG. 4.2 may be executed by, for example, the above-discussed discovery agent, template agent (e.g., 206, FIG. 2), and integration agent (e.g., 208, FIG. 2). Other components of the system (100) illustrated in FIG. 1 may also execute all or part of the method shown in FIG. 4.2 without departing from the scope of the embodiments disclosed herein.

In Step 416, by employing a set of linear, non-linear, and/or ML models (e.g., a depth-first search (DFS) model), the discovery agent converts the DAG to a tree-like data structure (e.g., for easier traversal, for focused processing by subsequent components/agents, etc.). In one or more embodiments, the use of the DFS model enables the traversal of all paths and connections originating from a specific node (in the tree-like data structure). Further, the conversion to the tree-like data structure provides a comprehensive understanding of the interdependencies (between the nodes) in the DAG.

In Step 418, the discovery agent analyzes the tree-like data structure to extract an inference result. In one or more embodiments, the inference result may specify, for example (but not limited to): a number of VMs that the environment needs to execute, a hardware resource set that needs to be available in the environment, etc. In Step 420, the discovery agent provides the inference result and the predefined configurations to the template agent.

In Step 422, the template agent queries the RAG module (e.g., 222, FIG. 2) to obtain additional information/context (with respect to the environment) from the RAG module. In one or more embodiments, the additional information (which would provide semantic understanding of the inference result to the ML model (described above in reference to FIG. 2) that is being implemented by the template agent via the model inference engine (e.g., 218, FIG. 2)) may include, for example, a KB document indicating how to manage a workload in the environment.

In Step 424, using the ML model, the template agent generates the declarative template (e.g., an IaC template, a blueprint, a state file, etc., which is in a human-readable format) that is specific to the environment using the inference result, configurations, and additional information. In one or more embodiments, the declarative template may be IaC platform-agnostic, enabling seamless management across diverse IaC and IoT platforms that support declarative templates.

In Step 426, by performing a dry run of the declarative template (e.g., by emulating the declarative template to check whether or not the template is suitable for the IaC platform to consume), the template agent makes a determination (in real-time or near real-time) as to whether the declarative template is verified/validated. Accordingly, in one or more embodiments, if the result of the determination is YES, the method proceeds to Step 428. If the result of the determination is NO (which means that the template may need to be regenerated or refined until the template is verified (or corrected) so that the IaC platform can understand the template to perform its functionalities), the method may return to Step 424.

In one or more embodiments, in order to verify the template (e.g., in order to verify whether or not the template is correct and contextually relevant), the template agent may, for example (but not limited to): check for (and/or correct) grammatical errors according to a target format, check for logical inconsistencies or potential errors within the content of the template, employ/invoke format-specific tools to perform additional validation of the template, check whether or not the template is tailored to the unique requirements (e.g., to the predefined configurations) of the IaC platform, etc.

In Step 428, as a result of the determination in Step 426 being YES, the template agent provides the "verified" declarative template to the integration agent. In Step 430, using the "corresponding" management API, the integration agent provides the "verified" declarative template, for example, to the storage (e.g., 304, FIG. 3) of the IaC platform using the "storage route". As yet another example, using the "API invocation route", the integration agent may invoke the APIs (e.g., 306, FIG. 3) so that the integration agent can provide the "verified" declarative template to the processor (of the IaC platform). Thereafter, based on the template (indicating, e.g., what applications need to be deployed to the environment, what are the features of those applications, what computing resources should be deployed to the environment, what are the features of those resources, what workloads need to be removed from the environment, etc.), the processor may provision and manage the computing environment (e.g., removing the unhealthy/inactive VM from the environment, deploying an active VM to the environment, restarting another pod in the environment, etc.). In one or more embodiments, in the request (received in Step 400 of FIG. 4.1), what route should be followed/selected may be specified (e.g., by the user). In one or more embodiments, the method may end following Step 430.

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating a declarative template to manage a computing environment, the method comprising:

receiving, by a management application programming interface (API), a declarative template generation request from a workload management interface, wherein the management API and the workload management interface are operatively connected to each other over a network;

analyzing, by the management API, the request to extract a predefined configuration of a platform;

providing, by the management API, the predefined configuration and the request to a discovery agent (DA);

connecting, by the DA and based on the request, to the environment using a connection string;

after the connecting:

discovering, by the DA, the environment to obtain a dataset related to the environment;

analyzing, by the DA, the dataset to extract information;

generating, by the DA, a directed acyclic graph (DAG) based on the information;

analyzing, by the DA, the DAG to extract an inference result;

providing, by the DA, the inference result and the predefined configuration to a template agent (TA);

querying, by the TA, a retrieval-augmented generation (RAG) module to obtain additional information related to the environment;

generating, by the TA, the template that is specific to the environment using the inference result, the predefined configuration, and the additional information; and providing, by the TA, the template to an integration agent (IA), wherein the IA provides the template to the platform.

2. The method of claim 1, wherein, before connecting to the environment, the DA retrieves the connection string from a credential storage based on the request, and wherein the connection string is specific to the environment and comprises credentials associated with the environment.

3. The method of claim 1, wherein the dataset comprises a type of a computing resource being executed on the environment, a number of virtual machines that the environment is currently hosting, a type of a virtual machine being executed on the environment, and a relationship between a first application to a second application in the environment.

4. The method of claim 1, wherein the environment is a cloud environment, an on-premises environment, or a brownfield environment.

5. The method of claim 1, wherein the platform is an infrastructure as code (IaC) platform or an Internet of Things (IoT) platform, and wherein the platform leverages the template to perform workload management in the environment.

6. The method of claim 1, wherein a user, via a computing device, issues the request to the workload management interface by specifying which environment needs to be discovered in the request.

7. The method of claim 1, wherein the inference result specifies a number of virtual machines that the environment needs to execute and a hardware resource set that needs to be available in the environment.

8. The method of claim 1, wherein the additional information comprises a knowledge base document indicating how to manage a workload in the environment.

9. A non-transitory computer readable medium comprising computer readable program code, which when executed by a computer processor enables the computer processor to perform a method for generating a declarative template to manage a computing environment, the method comprising:
receiving a predefined configuration of a platform and a declarative template generation request from a management application programming interface (API),
wherein the management API receives the request from a workload management interface,
wherein the management API and the workload management interface are operatively connected to each other over a network, and
wherein the management API analyzes the request to extract the configuration;
connecting, based on the request, to the environment using a connection string;
after the connecting:
discovering the environment to obtain a dataset related to the environment;
analyzing the dataset to extract information;
generating a directed acyclic graph (DAG) based on the information;
analyzing the DAG to extract an inference result; and
providing the inference result and the predefined configuration to a template agent (TA),
wherein the TA queries a retrieval-augmented generation (RAG) module to obtain additional information related to the environment,
wherein the TA generates the template that is specific to the environment using the inference result, the predefined configuration, and the additional information, and
wherein the TA provides the template to an integration agent (IA), wherein the IA provides the template to the platform.

10. The non-transitory computer readable medium of claim 9,
wherein, before connecting to the environment, the connection string is retrieved from a credential storage based on the request, and
wherein the connection string is specific to the environment and comprises credentials associated with the environment.

11. The non-transitory computer readable medium of claim 9, wherein the dataset comprises a type of a computing resource being executed on the environment, a number of virtual machines that the environment is currently hosting, a type of a virtual machine being executed on the environment, and a relationship between a first application to a second application in the environment.

12. The non-transitory computer readable medium of claim 9, wherein the environment is a cloud environment, an on-premises environment, or a brownfield environment.

13. The non-transitory computer readable medium of claim 9,
wherein the platform is an infrastructure as code (IaC) platform or an Internet of Things (IoT) platform, and
wherein the platform leverages the template to perform workload management in the environment.

14. The non-transitory computer readable medium of claim 9, wherein the inference result specifies a number of virtual machines that the environment needs to execute and a hardware resource set that needs to be available in the environment.

15. The non-transitory computer readable medium of claim 9, wherein the additional information comprises a knowledge base document indicating how to manage a workload in the environment.

16. A system comprising:
a computing environment;
a platform;
an infrastructure node comprising a memory and a processor coupled to the memory,
wherein the processor is configured to execute a method for generating a declarative template to manage the environment, the method comprising:
receiving a predefined configuration of a platform and a declarative template generation request from a management application programming interface (API),
wherein the management API receives the request from a workload management interface,
wherein the management API analyzes the request to extract the predefined configuration;
connecting, based on the request, to the environment using a connection string;
discovering the environment to obtain a dataset related to the environment;
analyzing the dataset to extract information;
generating a directed acyclic graph (DAG) based on the information;
analyzing the DAG to extract an inference result; and
providing the inference result and the predefined configuration to a template agent (TA),
wherein the TA queries a retrieval-augmented generation (RAG) module to obtain additional information related to the environment,
wherein the TA generates the template that is specific to the environment using the inference result, the predefined configuration, and the additional information, and
wherein the TA provides the template to an integration agent (IA), wherein the IA provides the template to the platform.

17. The system of claim 16,
wherein, before connecting to the environment, the connection string is retrieved from a credential storage based on the request, and
wherein the connection string is specific to the environment and comprises credentials associated with the environment.

18. The system of claim 16, wherein the dataset comprises a type of a computing resource being executed on the environment, a number of virtual machines that the environment is currently hosting, a type of a virtual machine being executed on the environment, and a relationship between a first application to a second application in the environment.

19. The system of claim 16, wherein the environment is a cloud environment, an on-premises environment, or a brownfield environment.

20. The system of claim 16,
wherein the platform is an infrastructure as code (IaC) platform or an Internet of Things (IoT) platform, and wherein the platform leverages the template to perform workload management in the environment.

* * * * *